(12) United States Patent
Kurita et al.

(10) Patent No.: US 12,415,596 B2
(45) Date of Patent: Sep. 16, 2025

(54) RIBLET STRUCTURE AND OBJECT

(71) Applicant: JAPAN AEROSPACE EXPLORATION AGENCY, Tokyo (JP)

(72) Inventors: Mitsuru Kurita, Tokyo (JP); Hiroyuki Abe, Tokyo (JP); Monami Sasamori, Tokyo (JP); Seigo Koga, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 0 days.

(21) Appl. No.: 18/292,034

(22) PCT Filed: May 16, 2022

(86) PCT No.: PCT/JP2022/020423
§ 371 (c)(1),
(2) Date: Jan. 25, 2024

(87) PCT Pub. No.: WO2023/042481
PCT Pub. Date: Mar. 23, 2023

(65) Prior Publication Data
US 2025/0083794 A1    Mar. 13, 2025

(30) Foreign Application Priority Data
Sep. 14, 2021   (JP) ................ 2021-149517

(51) Int. Cl.
*B64C 3/18* (2006.01)
(52) U.S. Cl.
CPC .................. *B64C 3/187* (2013.01)
(58) Field of Classification Search
CPC .... B64C 21/10; B64C 2230/26; F15D 1/0035
See application file for complete search history.

(56) References Cited

U.S. PATENT DOCUMENTS 4,650,138 A * 3/1987 Grose .................. B64C 21/10
                                            244/130
4,759,516 A * 7/1988 Grose .................... F15D 1/06
                                            244/130
(Continued)

FOREIGN PATENT DOCUMENTS

JP    2005-529298 A    9/2005
JP    2009-504474 A    2/2009
(Continued)

OTHER PUBLICATIONS

Bai, Xiuqin. Numerical Analysis of Drag Reduction Performance of Different Shaped Riblet Surfaces. Marine Technology Society Journal, 2016. (Year: 2016).*

(Continued)

*Primary Examiner* — Joshua J Michener
*Assistant Examiner* — Michael B. Kreiner
(74) *Attorney, Agent, or Firm* — Saliwanchik, Lloyd & Eisenschenk (57) ABSTRACT

A riblet structure according to the present technology includes a plurality of riblets that are arranged in a width direction and each include a first wall portion and a second wall portion, the first wall portion being vertically provided to be substantially perpendicular to a bottom portion, the second wall portion including an inclined portion connected to the first wall portion at an apex portion and inclined with respect to a perpendicular direction at a predetermined angle.

13 Claims, 4 Drawing Sheets

(56) References Cited

U.S. PATENT DOCUMENTS

| | | | | |
|---|---|---|---|---|
| 4,863,121 | A | * | 9/1989 | Savill ..................... B63B 1/34 244/130 |
| 4,930,729 | A | * | 6/1990 | Savill ..................... B63B 1/34 244/130 |
| 5,133,516 | A | * | 7/1992 | Marentic ................. B05D 5/02 244/130 |
| 5,386,955 | A | * | 2/1995 | Savill ..................... B63B 1/34 244/130 |
| 5,542,630 | A | | 8/1996 | Savill |
| 5,971,326 | A | * | 10/1999 | Bechert .................. B64C 21/10 244/130 |
| 7,070,850 | B2 | * | 7/2006 | Dietz ..................... F15D 1/12 428/167 |
| 8,528,601 | B2 | * | 9/2013 | Dahm ..................... F02C 7/04 137/809 |
| 2006/0060722 | A1 | | 3/2006 | Choi et al. |
| 2010/0159204 | A1 | | 6/2010 | Van Merksteijn |
| 2019/0023379 | A1 | | 1/2019 | Okabayashi et al. |
| 2020/0263704 | A1 | | 8/2020 | Miyazaki et al. |
| 2024/0280122 | A1 | * | 8/2024 | Chiba ..................... B64C 21/10 |

FOREIGN PATENT DOCUMENTS

| | | | |
|---|---|---|---|
| JP | 7022238 B1 | 2/2022 | |
| WO | WO-2012082668 A2 * | 6/2012 | ............ B32B 27/08 |
| WO | 2017/149837 A1 | 9/2017 | |
| WO | 2018/139049 A1 | 8/2018 | |

OTHER PUBLICATIONS

Walsh, Michael. Turbulent Boundary Layer Drag Reduction Using Riblets. AIAA-82-0169. Jan. 1982. (Year: 1982).*

Walsh, Michael. Riblets for Aircraft Skin-Friction Reduction. 1986. (Year: 1986).*

Lapsa, Andrew. Experimental Study of Passive Ramps for Control of Shock—Boundary Layer Interactions. University of Michigan PhD dissertation. 2009. (Year: 2009).*

International Search Report dated Jul. 12, 2022 in International Application No. PCT/JP2022/020423.

Bechert, D. W. et al., "Experiments on drag-reducing surfaces and their optimization with an adjustable geometry," Cambridge University Press, 1997, 338:59-87.

* cited by examiner

RIBLET STRUCTURE AND OBJECT

CROSS-REFERENCE TO RELATED APPLICATIONS

This application is the U.S. national stage application of International Patent Application No. PCT/JP2022/020423, filed May 16, 2022, which claims the benefit under 35 U.S.C. § 119 of Japanese Application No. 2021-149517, filed Sep. 14, 2021, the disclosures of each of which are incorporated herein by reference in their entirety.

TECHNICAL FIELD

The present technology relates to a technology of a riblet structure or the like for reducing surface friction resistance to a fluid.

BACKGROUND ART

Conventionally, it has been known that surface friction resistance to a turbulent flow of a fluid such as gas or liquid can be reduced by providing a predetermined riblet pattern on a surface of an aircraft or the like.

Non-Patent Literature 1 below discloses a structure in which isosceles triangular riblets are arranged along a width direction, and it is disclosed that the isosceles triangular riblets can reduce surface friction resistance by approximately 5% to 6% at a maximum (see FIGS. 19 and 20 of Non-Patent Literature 1 below).

The isosceles triangular riblet has a tendency that as the angle of the apex portion becomes sharper, the surface friction resistance can be reduced. In this regard, Non-Patent Literature 1 below proposes riblets each formed into a plate shape thinned to the limit (linearly as viewed from the front) as a shape in which the angle of the apex portion is sharpened to the limit. Such plate-shaped riblets thinned to the limit can reduce the surface friction resistance by approximately 10% at a maximum (see FIGS. 19 and 20 of Non-Patent Literature 1 below).

The plate-shaped riblets thinned to the limit are known as having a shape capable of reducing the most surface friction resistance at the present.

CITATION LIST

Non-Patent Literature

Non-Patent Literature 1: Bechert, D, W., Bruse, M., Hage, W., Van der Hoeven, J, G, T., and Hoppe, G., "Experiments on drag-reducing surfaces and their optimization with an adjustable geometry," Journal of fluid mechanics, vol. 338, pp. 59-87, 1997.

DISCLOSURE OF INVENTION

Technical Problem

However, if plate-shaped riblets thinned to an upper processing limit are formed, such riblets have a problem in that they are structurally fragile and are not suitable for practical use.

In view of the circumstances as described above, it is an object of the present technology to provide a technology of a riblet structure or the like that can effectively reduce surface friction resistance while having strength of a certain level or more.

Solution to Problem

A riblet structure according to the present technology includes a plurality of riblets that are arranged in a width direction and each include a first wall portion and a second wall portion, the first wall portion being vertically provided to be substantially perpendicular to a bottom portion, the second wall portion including an inclined portion connected to the first wall portion at an apex portion and inclined with respect to a perpendicular direction at a predetermined angle.

It is possible to provide a riblet structure that can effectively reduce surface friction resistance while having strength of a certain level or more.

In the riblet structure, first wall portion sides of the riblets adjacent to each other in the width direction may face each other, and second wall portion sides thereof may face each other.

In the riblet structure, the second wall portion may further include a perpendicular portion vertically provided to be substantially perpendicular to the bottom portion and connected to the inclined portion.

In the riblet structure, the inclined portion may include a first inclined portion that is inclined with respect to the perpendicular direction at the predetermined angle, and a second inclined portion that is inclined with respect to the perpendicular direction at an angle different from the predetermined angle and is closer to the bottom portion than the first inclined portion.

In the riblet structure, the angle at which the second inclined portion is inclined with respect to the perpendicular direction may be sharper than the angle at which the first inclined portion is inclined with respect to the perpendicular direction.

In the riblet structure, the predetermined angle may be in a range of 20° or more and 60° or less.

In the riblet structure, the predetermined angle may be in a range of 35° or more and 50° or less.

In the riblet structure, when a distance in the width direction between two of the apex portions of the riblets adjacent to each other is denoted by s, a friction velocity is denoted by $u_\tau$, and a kinematic viscosity coefficient is denoted by v, a dimensionless riblet interval $s^+$ represented by $s^+ = s u_\tau / v$ may be in a range of 10 or more and to 30 or less.

In the riblet structure, the dimensionless riblet interval $s^+$ may be in a range of 10 or more and 25 or less.

In the riblet structure, the dimensionless riblet interval $s^+$ may be in a range of 15 or more and 22 or less.

In the riblet structure, when a distance in the width direction between two of the apex portions of the riblets adjacent to each other is denoted by s, a height h of the riblet may be in a range of 0.05 times or more and 1.5 times or less the distance s.

In the riblet structure, when a distance in the width direction between two of the apex portions of the riblets adjacent to each other is denoted by s, a distance d in the width direction between lowermost points of two of the inclined portions facing each other in the riblets adjacent to each other may be in a range of 0.1 times or more and 0.98 times or less the distance s.

An object according to the present technology includes a riblet structure on a surface of the object, the riblet structure including a plurality of riblets that are arranged in a width direction and each include a first wall portion and a second wall portion, the first wall portion being vertically provided to be substantially perpendicular to a bottom portion, the second wall portion including an inclined portion connected to the first wall portion at an apex portion and inclined with respect to a perpendicular direction at a predetermined angle.

Advantageous Effects of Invention

As described above, according to the present technology, it is possible to provide a technology of a riblet structure or the like that can effectively reduce surface friction resistance while having strength of a certain level or more.

MODE(S) FOR CARRYING OUT THE INVENTION

Hereinafter, embodiments of the present invention will be described with reference to the drawings.

First Embodiment

<Overall Configuration of Riblet Structure 30 and Configuration of Each Portion>

Figure 1:
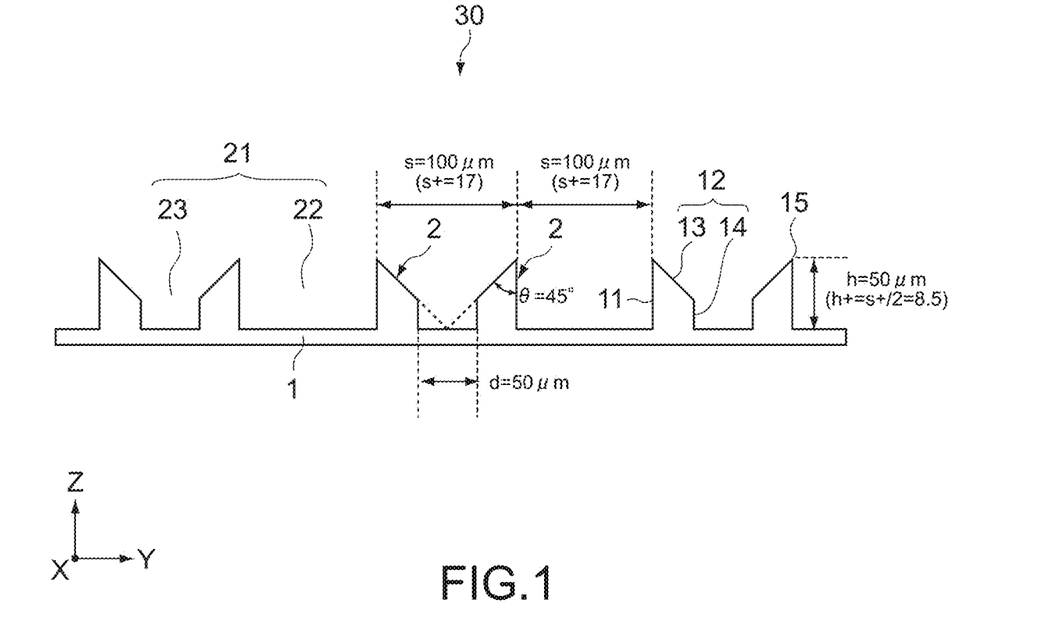
FIG. 1 is a diagram showing a riblet structure according to a first embodiment.

FIG. 1 is a diagram showing a riblet structure 30 according to a first embodiment of the present technology.

The riblet structure 30 according to this embodiment can reduce surface friction resistance to a turbulent flow of a fluid. The riblet structure 30 is provided onto a surface of an object. As the method of providing the riblet structure 30 onto a surface of an object, there are two methods of bonding riblets formed into a sheet shape onto the surface of the object and of directly forming riblets onto the surface of the object, but any one of the methods may be used.

Examples of the object provided with the riblet structure 30 include an aircraft, a ship, a car, a turbine, a fan, and a fluid device. Note that the riblet structure 30 can be provided to any object as long as it is intended to reduce the surface friction resistance to a turbulent flow of a fluid.

The riblet structure 30 is made of various materials such as a resin, a metal, and a coating film, but may be made of any material.

As shown in FIG. 1, the riblet structure 30 includes a base portion 1 (bottom portion) and a plurality of riblets 2 vertically provided on the base portion 1.

The base portion 1 is formed into a flat plate shape that is thin in a thickness direction (Z-axis direction) and wide in a plane direction (XY directions). The bottom surface of the base portion 1 is bonded to a surface of an object, on which the riblets 2 are to be formed, for example, via an adhesive layer. Typically, the thickness of the base portion 1 is approximately 5 μm or more and several mm or less. Note that the base portion 1 can be omitted, and in such a case, the riblets 2 are directly formed onto the surface (bottom portion) of the object.

Each of the plurality of riblets 2 has a shape that is long in a length direction (X-axis direction), short in a width direction (Y-axis direction), and low in a height direction (Z-axis direction).

The riblet 2 may be formed linearly in the length direction or may be formed in a sinusoidal shape (as viewed from above). When the riblet 2 is formed in a sinusoidal shape in the length direction, a height h of the riblet 2 may be formed in a sinusoidal shape (as viewed from the side-surface side (Y-axis direction)).

Each of the plurality of riblets 2 includes a first wall portion 11 substantially perpendicular to the base portion 1, and a second wall portion 12 that is opposite to the first wall portion 11 with an apex portion 15 interposed therebetween and includes an inclined portion 13.

Further, the plurality of riblets 2 are arranged along the width direction such that the first wall portion 11 sides of the riblets 2 adjacent to each other in the width direction (Y-axis direction) face each other, and the second wall portion 12 sides thereof face each other.

The first wall portion 11 is vertically provided to be substantially perpendicular to the base portion 1. Here, the wording "substantially perpendicular" means approximately ±10° with respect to the perpendicular direction (Z-axis direction). In other words, the riblet 2 according to this embodiment has a small size as will be described later, which makes it difficult to form the first wall portion 11 strictly in the perpendicular direction due to a problem of a processing accuracy in some cases. For that reason, it is assumed that the first wall portion 11 is substantially perpendicular as long as it is at approximately ±10° with respect to the perpendicular direction.

The second wall portion 12 includes the inclined portion 13 and a perpendicular portion 14. The inclined portion 13 is connected to the first wall portion 11 at the apex portion 15, and is inclined with respect to the perpendicular direction (Z-axis direction) at a predetermined angle. The perpendicular portion 14 is vertically provided to be substantially perpendicular to the base portion 1 and is connected to the inclined portion 13. Note that the wording "substantially perpendicular" in the perpendicular portion 14 also means approximately ±10° with respect to the perpendicular direction (Z-axis direction) as described above.

In the second wall portion 12, an angle θ (angle θ of apex portion 15) at which the inclined portion 13 is inclined with respect to the perpendicular direction (Z-axis direction) is set from the following viewpoints. First, as the angle θ becomes sharper, surface friction resistance to a turbulent flow of a fluid can be reduced. On the other hand, as the angle θ becomes sharper, the riblet 2 becomes narrower in the width direction and its strength decreases, and further processing becomes difficult to perform.

From such viewpoints, the lower limit value of the angle θ is set to 20°. If the angle θ is set to 20° or more, the riblet 2 can have strength of a certain level or more within a range in which processing is possible, and the surface friction resistance can be reduced. On the other hand, the upper limit value of the angle θ is set to 60°. If the angle θ is set to 60° or less, it is possible to improve the strength while obtaining a reduction effect of a certain level or more with respect to the surface friction resistance, and it is also possible to reduce the difficulty of processing.

In other words, the angle θ at which the inclined portion 13 is inclined with respect to the perpendicular direction is typically in the range of 20° or more and 60° or less, and favorably in the range of 35° or more and 50° or less. Note that the angle θ is set to 45° in the example shown in FIG. 1.

A distance s in the widthwise direction (Y-axis direction) between the two apex portions 15 of the riblets 2 adjacent to each other is typically 10 µm or more and several mm or less. Note that the distance s is set to 100 µm in the example shown in FIG. 1.

Note that there are two types of distance s between the two apex portions 15 in this embodiment. The first is a distance s at a position where the first wall portion 11 sides face each other (at a position of U-shaped first groove portion 22), and the second is a distance s at a position where the second wall portions 12 face each other (at a position of Y-shaped second groove portion 23). Those two distances s are typically the same, but may be different from each other.

Further, the height h of the riblet 2 is typically set to 0.05 times or more and 1.5 times or less the distance s. Note that the height h is set to 0.5 times the distance s, 50 µm, in the example shown in FIG. 1.

Further, a distance d in the width direction between the lowermost points of the two inclined portions 13 facing each other in the riblets 2 adjacent to each other (distance d between perpendicular portions 14) is typically 0.1 times or more and 0.98 times or less the distance s. Note that the distance d is set to 0.5 times the distance s, 50 µm, in the example shown in FIG. 1.

Here, if the distance d in the width direction between the lowermost points of the two inclined portions 13 (distance d between perpendicular portions 14) is too large, the width of the riblet 2 becomes too small, so that the strength is reduced. From this viewpoint, the upper limit value of the distance d is set to 0.98 times the distance s. On the other hand, if the distance d is too small, a region on the lower side of the Y-shaped second groove portion 23 becomes small, so that the surface friction resistance to a turbulent flow of a fluid increases. Therefore, from this viewpoint, the lower limit value of the distance d is set to 0.1 times the distance s.

The plurality of riblets 2 are constituted by a plurality of groove portions 21 arranged along the width direction (Y-axis direction). The plurality of groove portions 21 include the first groove portions 22 and the second groove portions 23 alternately arranged in the width direction. In this embodiment, the first groove portions 22 and the second groove portions 23 have different shapes.

The first groove portion 22 is formed by a space surrounded by the two first wall portions 11 facing each other and the base portion 1. The shape of the first groove portion 22 is rectangular and is generally U-shaped.

The second groove portion 23 is formed by a space surrounded by the two second wall portions 12 facing each other and the base portion 1. The shape of the second groove portion 23 is an inverted trapezoidal shape on the apex portion 15 side and a rectangular shape on the bottom portion side, and is generally Y-shaped.

<Basic Concept>

Figure 2:
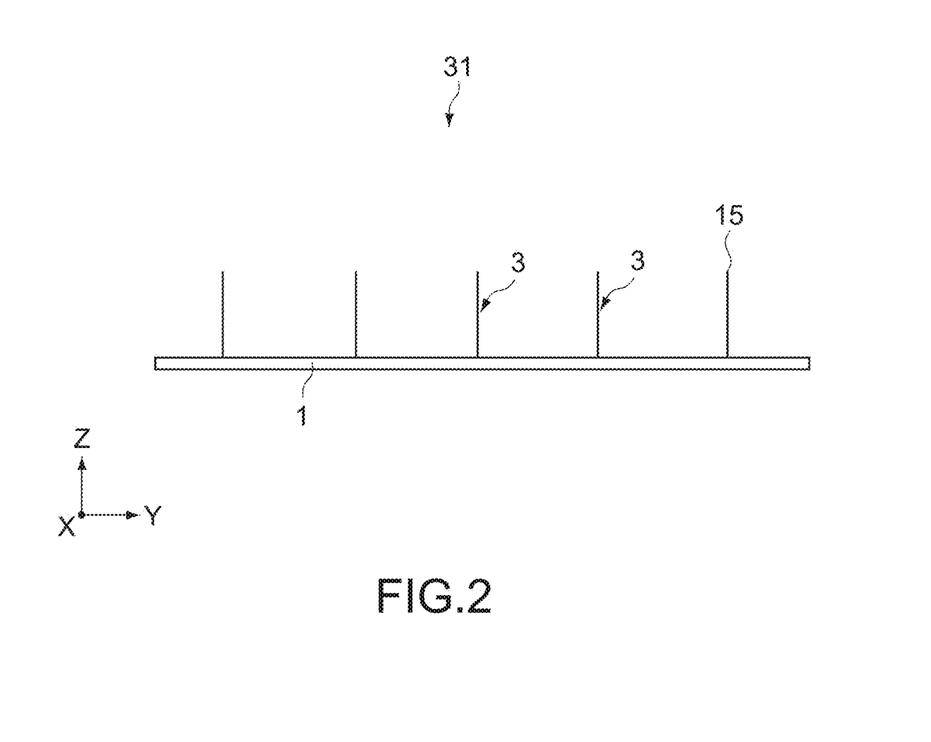
FIG. 2 is a diagram showing a plate-shaped riblet structure thinned to the limit.

Next, the basic concept of the present technology will be described. FIG. 2 is a diagram showing a riblet structure 31 including plate-shaped riblets 3 thinned to the limit. As shown in FIG. 2, in the riblet structure 31, the riblet 3 has a plate shape having a width thinned to the limit. In such a riblet structure 31, it is known that surface friction resistance to a turbulent flow of a fluid can be reduced to 10% at a maximum.

However, even if the plate-shaped riblets 3 thinned to the upper processing limit are formed, such riblets 3 are structurally fragile and are not suitable for practical use.

Here, the inventors of the present technology have considered that points of improving the performance of reducing surface friction resistance by the riblets 2 are to sharpen the apex portion 15 at which a flow is strong due to a turbulent flow of a fluid and to minimize the surface area of the apex portion 15, and also to maximize the volume inside the groove portion 21 at which the flow is weak. On the other hand, for practical use, it is necessary to ensure strength of a certain level in the riblets 2 and it is also necessary to consider a range in which processing is possible.

In other words, the following four points are considered for the riblet structure 30 according to this embodiment: 1. Sharpen the apex portion 15 as much as possible; 2. Maximize the volume inside the groove portion 21 as much as possible; 3. Ensure strength of a certain level or more; and 4. Fall within a range in which processing is possible (Facilitate processing). If those four points are satisfied, the surface friction resistance is reduced while ensuring strength of a certain level or more in the riblets 2 within a range in which processing is possible.

Here, the two first wall portions 11 facing each other in the width direction are substantially perpendicular. Thus, the first groove portion 22 is assumed to be rectangular, and the volume thereof is taken as large as possible. Therefore, the surface friction resistance can be effectively reduced.

It is also desired to form the second wall portion 12 side to be substantially perpendicular to form the riblet 2 as a plate thinned to the limit, like the riblet 3 thinned to the limit, if possible. In this case, however, it is not possible to ensure strength of a certain level or more in the riblet 2. In this regard, in this embodiment, the inclined portion 13 is provided on the second wall portion 12 side.

As the angle θ (angle θ of apex portion 15) at which the inclined portion 13 is inclined with respect to the perpendicular direction in the second wall portion 12 becomes sharper, the surface friction resistance can be reduced. However, as the angle θ becomes sharper, the riblet 2 becomes narrower in the width direction and its strength decreases, and further processing becomes difficult to perform. Therefore, as described above, the angle θ is in the range of 20° or more and 60° or less, and favorably in the range of 35° or more and 50° or less.

The lowermost point of the inclined portion 13 in the second wall portion 12 may be in contact with the upper surface of the base portion 1, and the second groove portion 23 may have a shape of an inverted triangle (in this case, the second groove portion 23 generally has a V-shape). In this case, however, the volume of the second groove portion 23 is slightly reduced. In this regard, the second wall portion 12 is provided with the perpendicular portion 14 on the lower side of the inclined portion 13, and thus a rectangular portion is formed on the lower side of the inverted trapezoidal shape in the second groove portion 23. Thus, it is possible to effectively reduce the surface friction resistance also in the second groove portion 23.

<Evaluation of Performance of Reducing Surface Friction Resistance>

Next, the evaluation of performance of reducing the surface friction resistance of the riblets 2 with respect to a turbulent flow of a fluid will be described.

Figure 3:
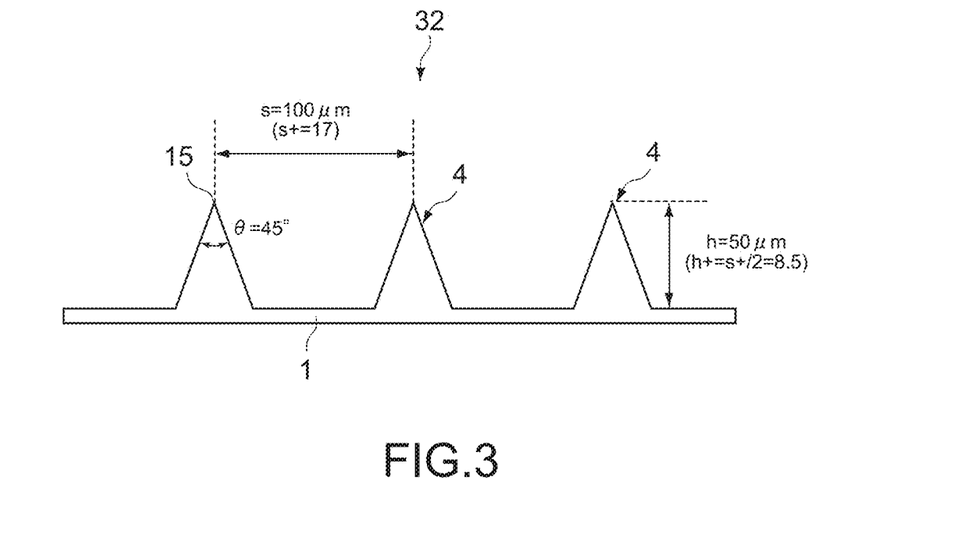
FIG. 3 is a diagram showing a riblet structure according to a comparative example.

In this evaluation, the riblet structure 30 according to this embodiment and a riblet structure 32 according to a comparative example were compared in the performance of reducing the surface friction resistance. FIG. 3 is a diagram showing the riblet structure 32 according to the comparative example. A riblet 4 according to the comparative example has an isosceles triangular shape.

In this evaluation, in the riblet 2 according to this embodiment and the riblet 4 according to the comparative example, the reduction rate of the surface friction resistance with respect to a dimensionless riblet interval s+ was analyzed using a numerical method called direct numerical simulation (DNS). Note that Fortran was used as the language of a calculation program in this DNS analysis.

Figure 4:
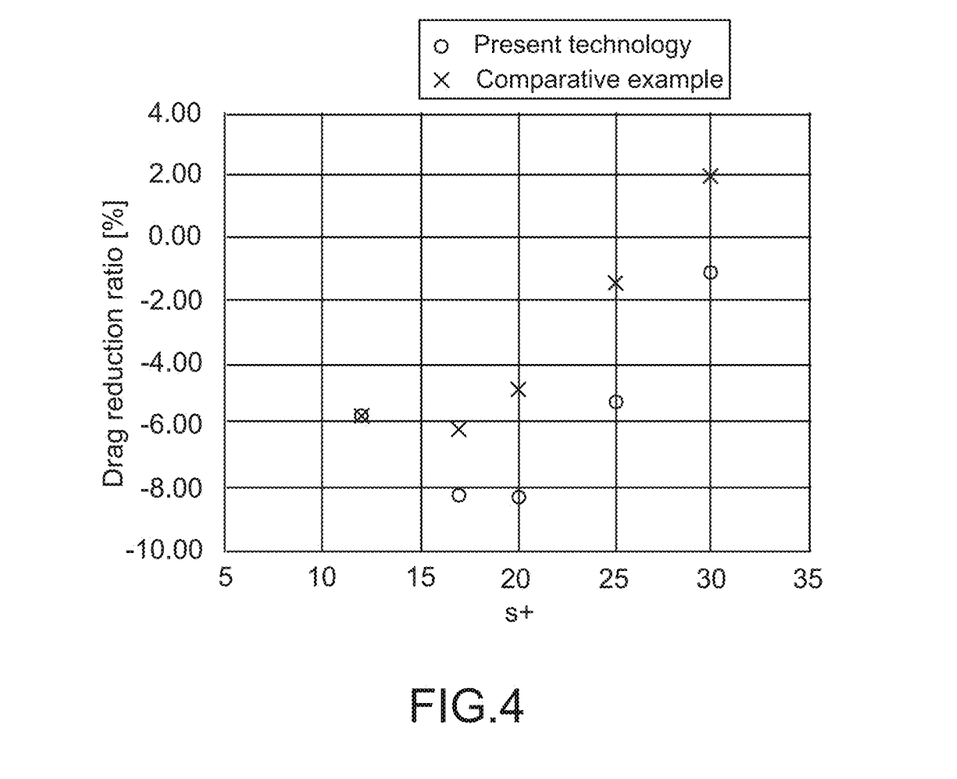
FIG. 4 is a diagram showing a reduction rate of surface friction resistance with respect to a dimensionless riblet interval s+ in the riblets according to this embodiment and the riblets according to the comparative example.

FIG. 4 is a diagram showing the reduction rate of the surface friction resistance with respect to the dimensionless riblet interval s+ in the riblet 2 according to this embodiment and the riblet 4 according to the comparative example.

Here, $s^+$ means the Reynolds number based on the distance s between the two apex portions 15 in the riblets 2 adjacent to each other, and $s^+ = su_\tau/v$ is a dimensionless riblet interval. Note that $u_\tau$ is a friction velocity, and v is a kinematic viscosity coefficient of the fluid. The friction velocity $u_\tau$ is represented by $u_\tau = (\tau_w/\rho)^{1/2}$ using a shear stress $\tau_w$ acting on the wall surface and a density $\rho$ of the fluid.

In FIG. 4, in this embodiment and the comparative example, the dimensionless riblet interval $s^+$ was changed by changing the distance s between the two apex portions 15 of the riblets 2, 4 adjacent to each other, and what value is taken as the reduction rate of the surface friction resistance was analyzed.

Note that, in this embodiment and the comparative example, the riblets 2, 4 are formed to be linearly straight in the length direction. Further, in this embodiment and the comparative example, the height h of the riblet 2, 4 is ½ times the distance s (that is, the height h varies according to the value of the distance s), and further, the angle θ of the apex portion 15 is fixed at 45°. Furthermore, in this embodiment, the distance d between the lowermost points of the two inclined portions 13 is set to ½ times the distance s (that is, the distance d varies according to the value of the distance s).

As is apparent from FIG. 4, in this embodiment, when the dimensionless riblet interval $s^+$ is set to approximately 10 or more and approximately 30 or less, the reduction rate of the surface friction resistance is improved as compared to that of the comparative example.

Specifically, in the comparative example (refer to cross marks), the reduction rate of the surface friction resistance is approximately 6% at a maximum. On the other hand, in this embodiment (refer to circle marks), the reduction rate of the surface friction resistance is approximately 8% at a maximum.

In other words, in this embodiment, it is possible to reduce the surface friction resistance by approximately 8% at a maximum while setting the riblets 2 having strength of a certain level or more within a range in which processing is possible, though it does not reach 10% that is the reduction rate of the surface friction resistance of the plate-shaped riblets 3 thinned to the limit.

Here, in this embodiment, the reduction rate of the surface friction resistance varies according to a change in the dimensionless riblet interval $s^+$, and thus the value of $s^+$ has an appropriate range. Typically, $s^+$ is in the range of 10 or more and 30 or less, favorably in the range of 10 or more and 25 or less, and more favorably in the range of 15 or more and 22 or less.

Note that, as shown in FIG. 1, if the distance s is set to 100 μm in an airflow assuming a case of an aircraft, the dimensionless riblet interval s is approximately 17. In this case, the surface friction resistance can be reduced by approximately 8%.

<Effects and Others>

As described above, the riblet structure 30 according to this embodiment is constituted in a manner that the plurality of riblets 2 are arranged in the width direction, the plurality of riblets 2 each including the first wall portion 11 vertically provided to be substantially perpendicular to the base portion 1, and the second wall portion 12 including the inclined portion 13 connected to the first wall portion 11 at the apex portion 15 and inclined with respect to the perpendicular direction at a predetermined angle.

This makes it possible to set the riblets 2 to have strength of a certain level or more and effectively reduce the surface friction resistance.

Further, in this embodiment, the first wall portion 11 sides of the riblets 2 adjacent to each other in the width direction face each other, and the second wall portion 12 sides thereof face each other. This makes it possible to increase a region of the first groove portion 22, which is surrounded by the two first wall portions 11 facing each other, and thus further effectively reduce the surface friction resistance.

Further, in this embodiment, the second wall portion 12 further includes the perpendicular portion 14 that is vertically provided to be substantially perpendicular to the bottom portion and connected to the inclined portion 13. This makes it possible to form a rectangular portion in the lower region of the second groove portion 23 surrounded by the two second wall portions 12 facing each other. Therefore, the region of the second groove portion 23 can be increased, so that the surface friction resistance can be further effectively reduced.

Further, in this embodiment, the angle θ (angle θ of apex portion 15) at which the inclined portion 13 is inclined with respect to the perpendicular direction (Z-axis direction) in the second wall portion 12 is typically in the range of 20° or more and 60° or less, and favorably in the range of 35° or more and 50° or less. This makes it possible to set the riblets 2 to have strength of a certain level or more within a range in which processing is possible and effectively reduce the surface friction resistance.

Further, in this embodiment, the height h of the riblet 2 is set in the range of 0.05 times or more and 1.5 times or less the distance s in the width direction between the two apex portions 15 adjacent to each other. This makes it possible to further effectively reduce the surface friction resistance.

Further, in this embodiment, the distance d in the width direction between the lowermost points of the two inclined portions 13 facing each other (width d of rectangular portion in second groove portion 23) is set in the range of 0.1 times or more and 0.98 times or less the distance s. This makes it possible to further effectively reduce the surface friction resistance by widening the width d of the rectangular portion in the second groove portion 23 as much as possible while setting the riblets 2 to have a certain width or more and have strength of a certain level or more.

Further, in this embodiment, the dimensionless riblet interval s is typically set in the range of 10 or more and 30 or less, favorably in the range of 10 or more and 25 or less, and more favorably in the range of 15 or more and 22 or less. This makes it possible to effectively reduce the surface friction resistance and reduce the surface friction resistance to approximately 8% at a maximum.

Second Embodiment

Next, a second embodiment of the present technology will be described. Note that in the description of the second embodiment and following embodiments, portions including configurations and functions similar to those of the first embodiment described above will be denoted by the same reference symbols and description thereof will be omitted or simplified.

Figure 5:
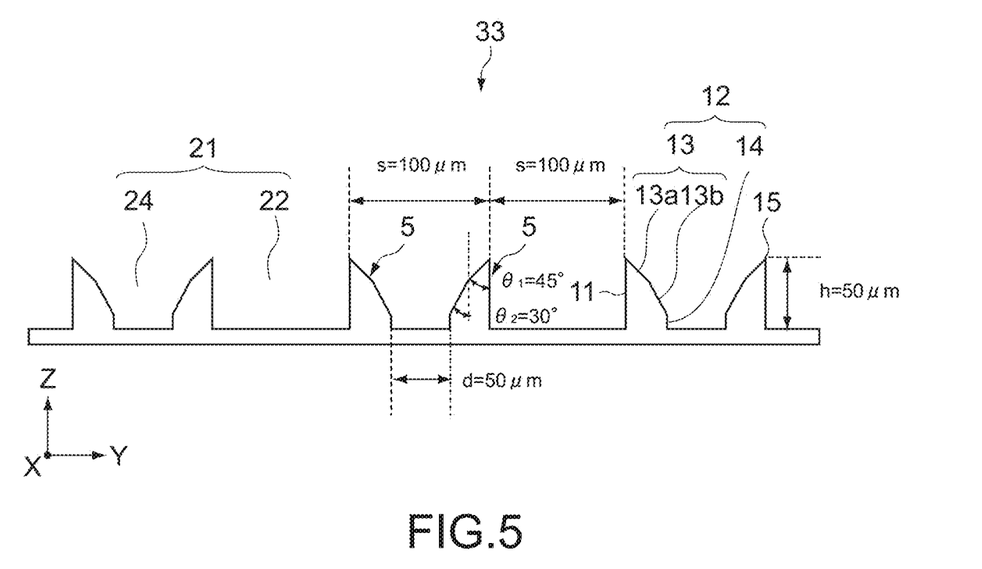
FIG. 5 is a diagram showing a riblet structure according to a second embodiment.

FIG. 5 is a diagram showing a riblet structure 33 according to the second embodiment. The second embodiment is different from the first embodiment described above in that the inclined portion 13 of the second wall portion 12 includes two steps. Therefore, this point will be mainly described.

In a riblet 5, the inclined portion 13 of the second wall portion 12 includes a first inclined portion 13a on an apex portion 15 side and a second inclined portion 13b on a bottom portion side. The first inclined portion 13a is inclined with respect to the perpendicular direction at a first angle θ1. The second inclined portion 13b is inclined with respect to the perpendicular direction at a second angle θ2 different from the first angle θ1. The second angle θ2 is an angle sharper than the first angle θ1.

As in the range of the angle θ (angle θ of apex portion 15) at which the inclined portion 13 is inclined in the first embodiment described above, the first angle θ1 is typically in the range of 20° or more and 60° or less, and favorably in the range of 35° or more and 50° or less. The second angle θ2 is typically set to 20° or more and to an angle less than the first angle θ1.

In the example shown in FIG. 5, an example in which the first angle θ1 is set to 45° and the second angle θ2 is set to 30° is shown.

Note that, in the second embodiment, the inclined portion 13 of the second wall portion 12 includes two steps, and thus the shape of a second groove portion 24 surrounded by the second wall portions 12 is different from that of the first embodiment. Specifically, the second groove portion 24 includes a first inverted trapezoidal portion on the apex portion 15 side, a second inverted trapezoidal portion in the middle, and a rectangular portion on the bottom portion side.

Also in the second embodiment, as in the first embodiment described above, it is possible to set the riblets 5 to have strength of a certain level or more within a range in which processing is possible and effectively reduce the surface friction resistance. Furthermore, in the second embodiment, the inclined portion 13 includes two steps and thus the volume of the second groove portion 24 is further increased. This makes it possible to further reduce the surface friction resistance.

Note that, in the second embodiment, the case where the inclined portion 13 includes the two steps has been described, but the inclined portion 13 may include three or more steps.

Third Embodiment

Next, a third embodiment of the present technology will be described. In each of the embodiments described above, the case where the perpendicular portion 14 is provided in the second wall portion 12 has been described. On the other hand, the perpendicular portion 14 can be omitted. In the third embodiment, a shape of the second wall portion 12 from which the perpendicular portion 14 is omitted will be described.

Figure 6:
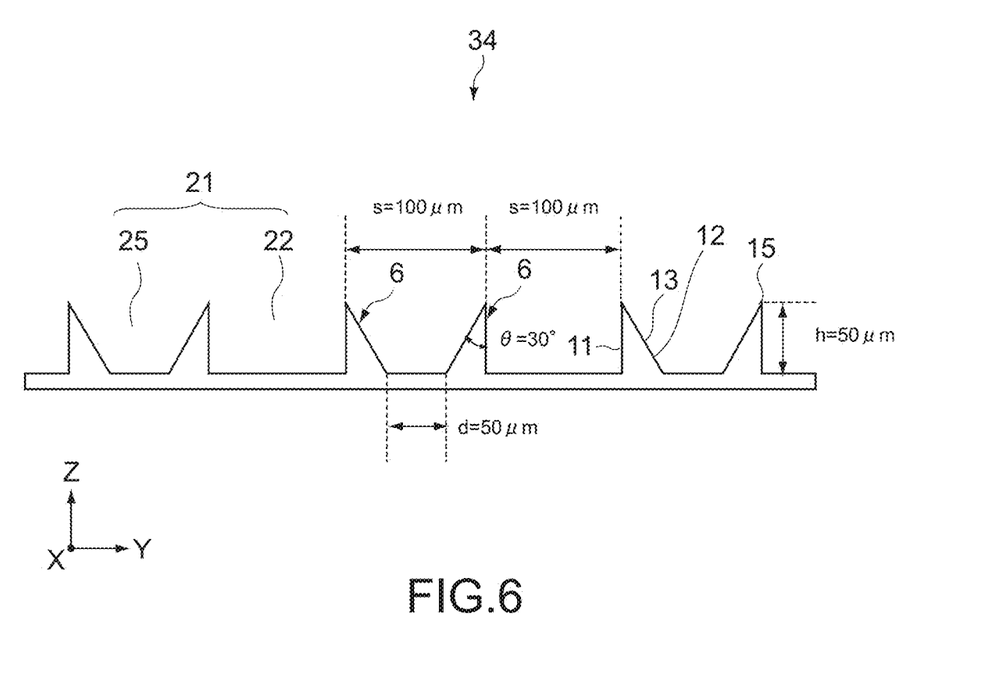
FIG. 6 is a diagram showing a riblet structure according to a third embodiment.

FIG. 6 is a diagram showing a riblet structure 34 according to the third embodiment. As shown in FIG. 6, in the third embodiment, the inclined portion 13 is connected to the base portion 1 and the perpendicular portion 14 is not provided in the second wall portion 12 of a riblet 6.

In the third embodiment, an angle θ at which the inclined portion 13 is inclined with respect to the perpendicular direction is typically in the range of 20° or more and 60° or less, and favorably in the range of 35° or more and 50° or less as in the embodiments described above. In the example shown in FIG. 6, the angle θ is set to 30°.

Further, in the example shown in FIG. 6, the distance d in the width direction between the lowermost points of the two inclined portions 13 facing each other is set to 50 μm. Note that the distance d can be appropriately changed (may be set to 0.1 times or more and 0.98 times or less the distance s).

Note that, in the third embodiment, the perpendicular portion 14 is omitted in the second wall portion 12, and thus the shape of a second groove portion 25 surrounded by the second wall portions 12 facing each other is different from that of each embodiment described above. Specifically, the shape of the second groove portion 25 is an inverted trapezoidal shape.

Also in the third embodiment, as in the embodiments described above, it is possible to set the riblets 6 to have strength of a certain level or more within a range in which processing is possible and effectively reduce the surface friction resistance.

Figure 7:
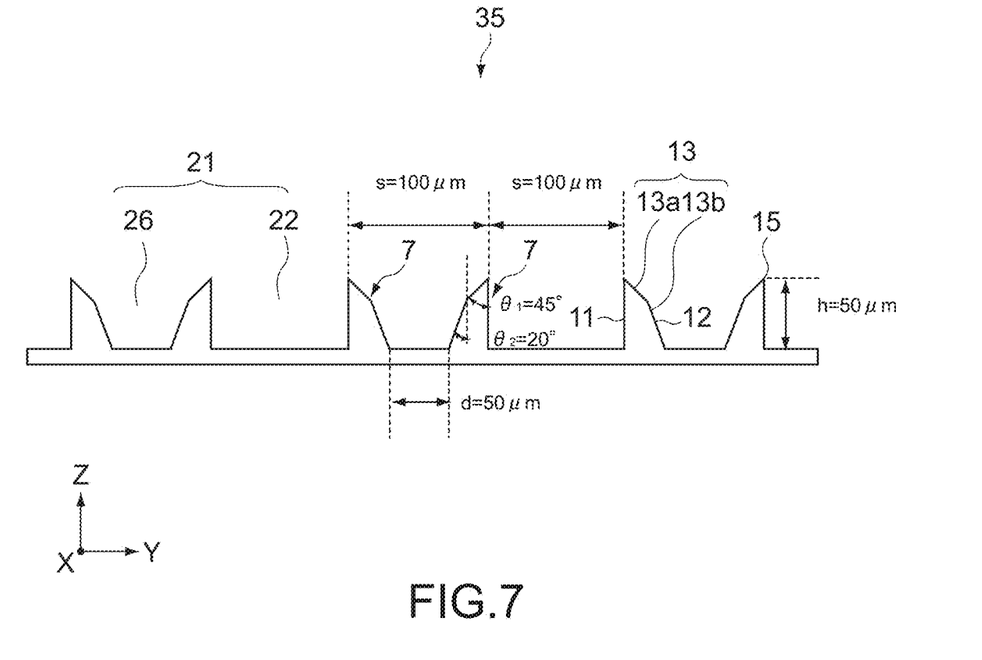
FIG. 7 is a diagram showing an example when an inclined portion of a second wall portion includes two or more steps in the third embodiment.

Here, in the third embodiment, as in the second embodiment, the inclined portion 13 of the second wall portion 12 can be provided with two or more steps. FIG. 7 is a diagram showing an example of a case where the inclined portion 13 of the second wall portion 12 includes two or more steps in the third embodiment.

In a riblet structure 35 shown in FIG. 7, the perpendicular portion 14 is omitted in the second wall portion 12 of a riblet 7, and the inclined portion 13 is connected to the base portion 1. The inclined portion 13 of the second wall portion 12 includes a first inclined portion 13a inclined with respect to the perpendicular direction at a first angle θ1 on the apex portion 15 side, and a second inclined portion 13b inclined with respect to the perpendicular direction at a second angle θ2.

The range of the first angle θ1 and the second angle θ2 is similar to that of the second embodiment described above. Note that, in the example shown in FIG. 7, an example in which the first angle θ1 is set to 45° and the second angle θ2 is set to 20° is shown.

Fourth Embodiment

Next, a fourth embodiment of the present technology will be described. In each of the embodiments described above, the case where the first wall portion 11 sides face each other and the second wall portion 12 sides face each other in the two riblets 2, 5, 6, 7, adjacent to each other has been described. On the other hand, in the two riblets 2 adjacent to each other, the first wall portion 11 and the second wall portion 12 may face each other.

Figure 8:
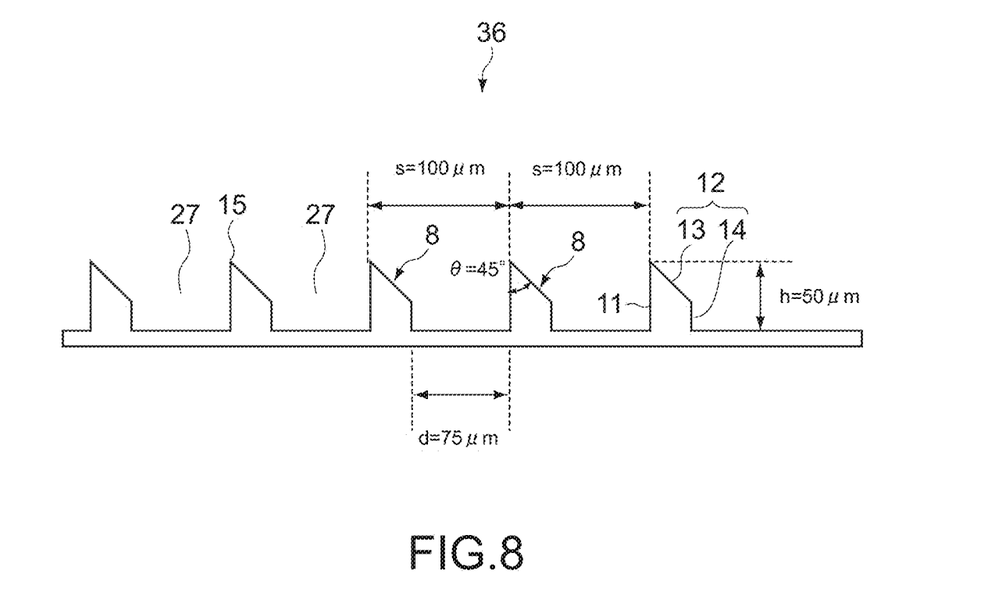
FIG. 8 is a diagram showing a riblet structure according to a fourth embodiment.

FIG. 8 is a diagram showing a riblet structure 36 according to a fourth embodiment. In the riblet structure 36, in two riblets 8 adjacent to each other, the first wall portion 11 and the second wall portion 12 face each other.

In the example shown in FIG. 8, a distance s between two apex portions 15 adjacent to each other is set to 100 μm, a height h of the riblet 8 is set to 50 μm, and an angle θ of the apex portion 15 is set to 45°, but those values can be appropriately changed in the ranges described above. Further, in the example shown in FIG. 8, a distance d between a first wall portion 11 and the lowermost point of the inclined portion 13 of the second wall portion 12 facing the first wall portion 11 is set to 75 μm, but such a value can also be appropriately changed.

Note that, in the fourth embodiment, groove portions 27 have the same shape. In the example shown in FIG. 8, the groove portion 27 includes an inverted trapezoidal portion on the apex portion 15 side and a rectangular portion on the bottom portion side.

Also in the fourth embodiment, as in the embodiments described above, it is possible to set the riblets 8 to have strength of a certain level or more within a range in which processing is possible and effectively reduce the surface friction resistance.

Note that, in the fourth embodiment, the inclined portion 13 can also be provided with two or more steps (see the second embodiment), or the perpendicular portion 14 can also be omitted (see the third embodiment).

REFERENCE SIGNS LIST 1 base portion
2 to 8 riblet
11 first wall portion
12 second wall portion
13 inclined portion
14 perpendicular portion
15 apex portion
30 to 36 riblet structure

The invention claimed is:

1. A riblet structure, comprising
a plurality of riblets that are arranged at intervals in a width direction and each include a first wall portion and a second wall portion, the first wall portion being vertically provided to be substantially perpendicular to a flat bottom portion, the second wall portion being connected to the first wall portion at an apex portion,
wherein the first wall portion is vertically provided to be substantially perpendicular from the apex portion to the flat bottom portion to form a groove portion having a right-angled cross section together with an upper surface of the flat bottom portion, and
wherein the second wall portion includes an inclined portion that is connected to the first wall portion at the apex portion and inclined with respect to a perpendicular direction at a predetermined angle.

2. The riblet structure according to claim 1, wherein
first wall portion sides of the riblets adjacent to each other in the width direction face each other to form a first groove portion having a rectangular cross section, and second wall portion sides thereof face each other to form a second groove portion having a Y-shaped cross section or an inverted trapezoidal cross section.

3. The riblet structure according to claim 2, wherein
when a distance in the width direction between two of the apex portions of the riblets adjacent to each other is denoted by s, a distance d in the width direction between lowermost points of two of the inclined portions facing each other in the riblets adjacent to each other is in a range of 0.1 times or more and 0.98 times or less the distance s.

4. The riblet structure according to claim 1, wherein
the second wall portion further includes a perpendicular portion vertically provided to be substantially perpendicular to the bottom portion and connected to the inclined portion.

5. The riblet structure according to claim 1, wherein
the inclined portion includes
a first inclined portion that is inclined with respect to the perpendicular direction at the predetermined angle, and
a second inclined portion that is inclined with respect to the perpendicular direction at an angle different from the predetermined angle and is closer to the bottom portion than the first inclined portion.

6. The riblet structure according to claim 5, wherein
the angle at which the second inclined portion is inclined with respect to the perpendicular direction is sharper than the angle at which the first inclined portion is inclined with respect to the perpendicular direction.

7. The riblet structure according to claim 1, wherein
the predetermined angle is in a range of 20° or more and 60° or less.

8. The riblet structure according to claim 7, wherein
the predetermined angle is in a range of 35° or more and 50° or less.

9. The riblet structure according to claim 1, wherein
when a distance in the width direction between two of the apex portions of the riblets adjacent to each other is denoted by s, a friction velocity is denoted by $u_\tau$, and a kinematic viscosity coefficient is denoted by $v$, a dimensionless riblet interval $s^+$ represented by $s^+ = s u_\tau / v$ is in a range of 10 or more and to 30 or less.

10. The riblet structure according to claim 9, wherein
the dimensionless riblet interval $s^+$ is in a range of 10 or more and 25 or less.

11. The riblet structure according to claim 10, wherein
the dimensionless riblet interval $s^+$ is in a range of 15 or more and 22 or less.

12. The riblet structure according to claim 1, wherein
when a distance in the width direction between two of the apex portions of the riblets adjacent to each other is denoted by s, a height h of the riblet is in a range of 0.05 times or more and 1.5 times or less the distance s.

13. An object, comprising
a riblet structure on a surface of the object, the riblet structure including
a plurality of riblets that are arranged at intervals in a width direction and each include a first wall portion and a second wall portion, the first wall portion being vertically provided to be substantially perpendicular to a flat bottom portion, the second wall portion being connected to the first wall portion at an apex portion,
wherein the first wall portion is vertically provided to be substantially perpendicular from the apex portion to the flat bottom portion to form a groove portion having a right-angled cross section together with an upper surface of the flat bottom portion, and
wherein the second wall portion includes an inclined portion that is connected to the first wall portion at the apex portion and inclined with respect to a perpendicular direction at a predetermined angle.

* * * * *